(12) United States Patent
Esprey (10) Patent No.: US 11,867,541 B2
(45) Date of Patent: Jan. 9, 2024

(54) DISTRIBUTED FIBRE OPTIC SENSING

(71) Applicant: OPTASENSE HOLDINGS LIMITED, Camberley (GB)

(72) Inventor: Chris Esprey, Farnborough (GB)

(73) Assignee: OPTASENSE HOLDINGS LIMITED, Camberley (GB)

( * ) Notice: Subject to any disclaimer, the term of this patent is extended or adjusted under 35 U.S.C. 154(b) by 527 days.

(21) Appl. No.: 16/614,216

(22) PCT Filed: Apr. 26, 2018

(86) PCT No.: PCT/GB2018/051094
§ 371 (c)(1),
(2) Date: Nov. 15, 2019

(87) PCT Pub. No.: WO2018/211237
PCT Pub. Date: Nov. 22, 2018

(65) Prior Publication Data
US 2020/0172130 A1 Jun. 4, 2020

(30) Foreign Application Priority Data

May 17, 2017 (GB) .................................... 1707946

(51) Int. Cl.
*G01D 5/353* (2006.01)
*B61L 1/16* (2006.01)
(Continued)

(52) U.S. Cl.
CPC .......... *G01D 5/35383* (2013.01); *B61L 1/166* (2013.01); *B61L 23/041* (2013.01);
(Continued)

(58) Field of Classification Search
CPC ...... G01H 9/004; G01H 9/006; B61L 25/025; B61L 1/166; B61L 1/20; B61L 23/04;
(Continued)

(56) References Cited

U.S. PATENT DOCUMENTS

2014/0362668 A1 12/2014 McEwen-King
2016/0191163 A1* 6/2016 Preston ................ G01B 11/161
398/16

FOREIGN PATENT DOCUMENTS

CN 104766099 7/2015
GB 2442745 4/2008
(Continued)

OTHER PUBLICATIONS

Papp et al. ("A real-time algorithm for train position monitoring using optical time-domain reflectometry," 2016 IEEE International Conference on Intelligent Rail Transportation (ICIRT), 2016, pp. 89-93) . (Year: 2016).*

(Continued)

*Primary Examiner* — Michelle R Connelly
(74) *Attorney, Agent, or Firm* — McDonnell Boehnen Hulbert & Berghoff LLP (57) ABSTRACT

This application relates to methods and apparatus for distributed fibre optic sensing and especially to the processing of signals derived from such sensing techniques to characterise events of interest. The application describes a method of distributed fibre optic sensing, comprising; performing distributed fibre optic sensing so as to generate at least one set of measurement signals from each of a plurality of sensing channels of an optical fibre (101) in response to at least one event of interest. For each set of measurement signals, processing the measurement signals from different sensing channels according to an association metric to determine whether any sensing channels are associated with one another and form at least one association matrix indicative of the sensing channels that are associated with one another. The method further comprising performing distributed fibre optic sensing to acquire a further set of measurement signals from said sensing channels in response to a further event of interest and processing said further set of (Continued)

measurement signals based on said at least one association matrix to characterise said further event of interest.

19 Claims, 4 Drawing Sheets (51) Int. Cl.
*B61L 23/04* (2006.01)
*B61L 25/02* (2006.01)
*G01H 9/00* (2006.01)

(52) U.S. Cl.
CPC ........... *B61L 23/042* (2013.01); *B61L 23/044* (2013.01); *B61L 23/047* (2013.01); *B61L 23/048* (2013.01); *B61L 25/025* (2013.01); *G01D 5/353* (2013.01); *G01D 5/35361* (2013.01); *G01H 9/004* (2013.01); *G01H 9/006* (2013.01)

(58) Field of Classification Search
CPC .... B61L 23/041; B61L 23/042; B61L 23/044; B61L 23/045; B61L 23/047; B61L 23/048; B61L 27/57; B61L 27/53; G01D 5/35383; G01D 5/353; G01D 5/35361; G01D 5/268

See application file for complete search history.

(56) References Cited

FOREIGN PATENT DOCUMENTS

| WO | 2013/016135 | 1/2013 | |
|----|---|---|---|
| WO | 2013/114129 | 8/2013 | |
| WO | WO-2013114135 A2 * | 8/2013 | ............. B61L 1/166 |
| WO | 2016/027072 | 2/2016 | |
| WO | WO-2016033199 A1 * | 3/2016 | ........... G01B 11/161 |
| WO | 2016/124944 | 8/2016 | |
| WO | 2017/093715 | 6/2017 | |

OTHER PUBLICATIONS

Timofeev, A. ("Monitoring the Railways by Means of C-OTDR Technology", ICCCI 2015: 17th International Conference on Computer Communication and Informatics, May 2015). (Year: 2015).*

Zeni et al. ("Monitoring railways with optical fibers", SPIE, Dec. 2, 2013) . (Year: 2013).*

* cited by examiner

DISTRIBUTED FIBRE OPTIC SENSING

FIELD OF THE INVENTION

This application relates to methods and apparatus for distributed fibre optic sensing and especially to the processing of signals derived from such sensing techniques to characterise events of interest.

BACKGROUND OF THE INVENTION

Distributed fibre optic sensing is a known type of sensing where an optical fibre is deployed as a sensing fibre and interrogated with electromagnetic radiation to provide sensing of environmental stimuli affecting the sensing fibre along its length. By analysing the radiation backscattered from within the fibre, the fibre can effectively be divided into a plurality of discrete sensing portions which may be (but do not have to be) contiguous.

One particular type of fibre optic sensor detects optical radiation which has been Rayleigh backscatter from within the sensing fibre. Within each discrete sensing portion mechanical disturbances of the fibre, for instance, dynamic strains due to incident acoustic waves, cause a variation in the properties of the radiation which is backscattered from that portion. This variation can be detected and analysed and used to give a measure of the intensity of disturbance of the fibre at that sensing portion. Such a fibre optic sensor effectively acts as a linear sensing array of acoustic sensing portions of optical fibre and thus such sensing is often referred to as distributed acoustic sensing (DAS).

Such DAS sensors typically perform repeated interrogations of the sensing fibre, where each interrogation involves transmitting at least one pulse of coherent optical radiation into the optical fibre and detecting the intensity of backscattered light from each of a number of sensing portions of the sensing fibre, also called channels, of the DAS sensor. In one type of DAS sensor the intensity of Rayleigh backscatter from a given channel in response to separate interrogations of the sensing fibre is monitored to determine any acoustic stimulus acting on the fibre and in one example each interrogation involves launching a single continuous pulse of coherent interrogating radiation. The backscatter from the fibre will depend on the distribution of the inherent scattering sites within the fibre, which will vary effectively randomly along the length of the fibre. Thus the backscatter intensity from any given interrogating pulse will exhibit a random variation from one sensing channel to the next but, in the absence of any environmental stimulus, the backscatter intensity from any given sensing channel should remain the same for each repeated interrogation (provided the characteristics of the interrogating pulse remains the same). However an environmental stimulus acting on the relevant sensing portion of the fibre will result in an optical path length change for that section of fibre, e.g. through stretching/compression of the relevant section of fibre and/or a refractive index modulation. As the backscatter from the various scattering sites within the sensing channel of fibre will interfere to produce the resulting intensity, a change in optical path length will vary the degree of interference and thus result in a change in backscatter intensity. This change in intensity can be detected and used as an indication of a disturbance acting on the fibre, such as an incident acoustic wave.

DAS sensors of the type described above have been usefully proposed for a number of applications such as monitoring of perimeters or borders or linear assets such as pipelines or the like for intruder detection or tampering. Another useful application of such DAS sensors is in the field of rail and train monitoring for example as described in WO2016/027072 and WO2013/106135. For instance DAS sensors have been proposed for monitoring train traffic in a rail network.

One issue arises for the use of DAS sensors in monitoring rail network where there may be areas with multiple tracks running alongside one another. The sensing fibre will be generally deployed to run along the path of the tracks and can track movement of trains along the tracks. However, determining the amount of lateral offset between the source of the acoustic signals and the sensing fibre can be difficult. It may not be possible to determine which track is occupied from the DAS sensor alone and external knowledge of what track the train is travelling on may be required, especially as the acoustic signals generated may vary for different trains and for different environmental conditions.

Also, it has been proposed to monitor rail infrastructure by monitoring the acoustic response for multiple train passes. As mentioned however different trains and different train speeds may result in different responses and environmental factors such as the weather conditions or temperature may affect the responses.

SUMMARY OF THE INVENTION

Embodiments of the present disclosure relate to methods and apparatus for distributed fibre optic sensing, especially for fibre optic distributed acoustic sensing, that at least mitigate some of the issues noted above.

Thus according to an embodiment of the present invention there is provided a method of distributed fibre optic sensing, comprising; performing distributed fibre optic sensing so as to generate at least one set of measurement signals from each of a plurality of sensing channels of an optical fibre in response to at least one event of interest; for the or each set of measurement signals, processing the measurement signals from different sensing channels according to an association metric to determine whether any sensing channels are associated with one another and form at least one association matrix indicative of the sensing channels that are associated with one another; performing distributed fibre optic sensing to acquire a further set of measurement signals from said sensing channels in response to a further event of interest; and processing said further set of measurement signals based on said at least one association matrix to characterise said further event of interest.

The method of an embodiment of the present disclosure thus acquires at least one set of measurement signals by performing distributed fibre optic sensing on a sensing optical fibre. Each set of measurement signals includes measurement signals from each of a plurality of sensing channels of optical fibre in response to at least one event of interest. The set of measurement signals is then processed to determine which sensing channels are associated with each other for the event(s) of interest, i.e. which sensing channels exhibit responses to the event(s) of interest that are similar to one another. The method thus determines at least one association matrix indicative of the sensing channels that are associated with one another, i.e. which sensing channels are expected to behave in the largely similar ways to a given event of interest, by assessing the measurement signals from the different sensing portions according to a define association metric. Such an association matrix can be used to characterise further events by analysing the measurement signals acquired from such a further event. For example the method may characteristic the further event as being of a particular type if the response from the sensing channels to the further event exhibits an association between channels that correspond to an association matrix for a particular type of event and/or the method may identify any significant change in channel association in the response to the further event to characterise the event as significant, e.g. indicative of an anomaly.

Determining which sensing channels are associated with one another may comprise processing the measurement signals for each sensing channel according to the association metric and determining the difference in association metrics for different channels. In some embodiments a sensing channel may be deemed to be associated with another sensing channel if the difference in association metrics for the respective sensing channels is below a defined limit.

Processing the measurement signals according to an association metric to determine which sensing channels are associated with one another of the method of distributed fibre optic sensing may additionally or alternatively comprise determining a likelihood of association for at least one pair of sensing channels. The association matrix may store, for each pair of sensing channels, the determined likelihood of association.

In some embodiments at least a first set of measurement signals may comprise measurement signals from the sensing channels in response to each of a plurality of events of interest. Processing the measurement signals of the first set may comprise taking a plurality of subsets of the measurement signals, where each subset corresponds to the measurement signals from one event of interest. The measurement signals of each subset may be processed according to the association metric to determine which sensing channels are associated with one another for that subset. The association matrix may be formed by combining results for the plurality of subsets. The likelihood of association for a pair of sensing channels may be determined by determining the proportion of subsets in which that pair of channels are determined to be associated with one another.

In some embodiments the method may comprise generating a plurality of sets of measurement signals and a corresponding association matrix for each set of measurement signals, where each set of measurement signals correspond to measurement signals acquired in response to respective events of interest identified as being of a different type to one another. In such a case, characterising the further event of interest may comprise determining whether the further event of interest matches one of the types of event of interest. Additionally or alternatively characterising the further event of interest may comprise determining whether the further set of measurement signals exhibits channel associations that corresponds to one of the determined association matrices. Determining whether the further event of interest matches one of the identified types of events of interest may comprise processing the further set of measurement signals and the association matrices using Bayesian inference.

In some embodiments the method may comprise, as the further set of measurement signals are acquired: determining a channel association for the further event of interest; and determining the probability that the further event of interest is of a first type based on a probability, determined from the association matrix for events of the first type, that the channel association would be experienced if the event were of the first type.

In some embodiments the association parameter may be a measure of acoustic intensity of the measurement signal of a sensing channel. For example the measure of acoustic intensity may be the root-mean-square power of the measurement signal over the event of interest. In such implementations, a pair of sensing channels may be identified as being associated with one another if the measure of acoustic intensity for each sensing channel is within a certain intensity range, say 1 dB for example.

In some embodiments the optical fibre may be deployed to run along the path of at least part of at least one rail track. An event of interest may comprise a train travelling on a rail track.

In some embodiments characterising the further event of interest may comprise identifying any significant change in channel association for the further event of interest compared to a previously determined association matrix.

In some embodiments at least part of the optical fibre may be deployed to run alongside a plurality of rail tracks. In such implementations a train travelling on one rail track may be identified as an event of interest of one type and a train travelling on another rail track may be identified as an event of interest of a different type. The method may involve determining which rail track the train is travelling on.

In another aspect there is provided a method of determining a track a train is travelling on using distributed fibre optic sensing, comprising; performing distributed fibre optic sensing on an optical fibre, at least part of which is deployed along the path of a plurality of rail tracks so as to generate measurement signals from each of a plurality of sensing channels of said optical fibre; detecting said measurement signals from a plurality of train passing events and forming the measurement signals into respective sets corresponding to the respective rail tracks the train travelled on; for each set, processing the measurement signals from different sensing channels according to an association metric to determine whether any sensing channels are associated with one another and form association matrix indicative of the sensing channels that are associated with one another; acquiring a further set of measurement signals from the sensing channels in response to a further train passing event; and processing said further set of measurement signals based on said association matrices to determine which track the further train passing event is derived from.

Each association matrix may comprise, for each pair of sensing channels, a likelihood of association of those sensing channels.

In a further aspect there is provided a method of distributed fibre optic sensing, comprising; performing distributed fibre optic sensing on an optical fibre deployed at least partly along the path of a rail track so as to generate a set of measurement signals from each of a plurality of sensing channels of said optical fibre for each of one or more train passing events; processing the measurement signals from different sensing channels according to an association metric to determine whether any sensing channels are associated with one another and form association matrix indicative of the sensing channels that are associated with one another; processing a further set of measurement signals from each of a plurality of sensing channels in response to a further train passing event based on the association matrix; and determining whether the further set of measurement signals exhibits a difference in channel association from the association matrix.

The method may comprise forming a normalised set of measurement signals which is normalised based on the association matrix. Detection of envelope modulation may be applied to the measurement signals to form the normalised set of measurement signals.

The method may comprise identifying a possible fault with the track based on an identified difference in channel association from the association matrix. Wherein the possible fault with the track may comprise a break in the rail track or the possible fault with the track may comprise flooding.

In still a further aspect there is provided a method of processing data from a distributed fibre optic sensor, comprising; taking at least one set of measurement signals, the set of measurement signals corresponding to data from each of a plurality of sensing channels of an optical fibre distributed fibre optic sensor acquired in response to at least one event of interest; for the or each set of measurement signals, processing the measurement signals from different sensing channels according to an association metric to determine whether any sensing channels are associated with one another and form at least one association matrix indicative of the sensing channels that are associated with one another; taking a further set of measurement signals corresponding to data acquired from optical fibre distributed acoustic sensor in response to a further event of interest; and processing said further set of measurement signals based on said at least one association matrix to characterise said further event of interest.

The invention also relates to a computer program on a non-transitory storage medium comprising computer readable instructions to cause a suitable processor to perform the method of processing data described above.

In a further aspect there is provided an apparatus, comprising; a distributed fibre optic sensor configured to interrogate an optical fibre deployed in an area of interest to detect measurement signals at each of a plurality of sensing channels of said optical fibre; and a processor, configured to: take at least one set of measurement signals acquired in response to at least one event of interest; for the or each set of measurement signals, process the measurement signals from different sensing channels according to an association metric to determine whether any sensing channels are associated with one another and form at least one association matrix indicative of the sensing channels that are associated with one another; take a further set of measurement signals corresponding to data acquired from the optical fibre distributed acoustic sensor in response to a further event of interest; and process said further set of measurement signals based on said at least one association matrix to characterise said further event of interest.

In an embodiment the optical fibre of the apparatus described above may be deployed in the vicinity of a rail track. The apparatus may be configured to implement any of the variants of any of the methods described above.

DESCRIPTION OF THE DRAWINGS

The invention will now be described by way of example only with respect to the accompanying drawings, of which.

DESCRIPTION OF THE INVENTION

Embodiments of the present disclosure relate to methods and apparatus for distributed fibre optic sensing, and in particular to the processing of fibre optic sensor data acquired in response to an event of interest in order to characterise that event of interest. Embodiments are particularly applicable to fibre optic distributed acoustic sensing (DAS) and the discussion below will focus on DAS, but the principles are applicable to other types of distributed fibre optic sensing, for example of sensing of dynamic temperature variations or other strain or temperature sensors etc.

Figure 1:
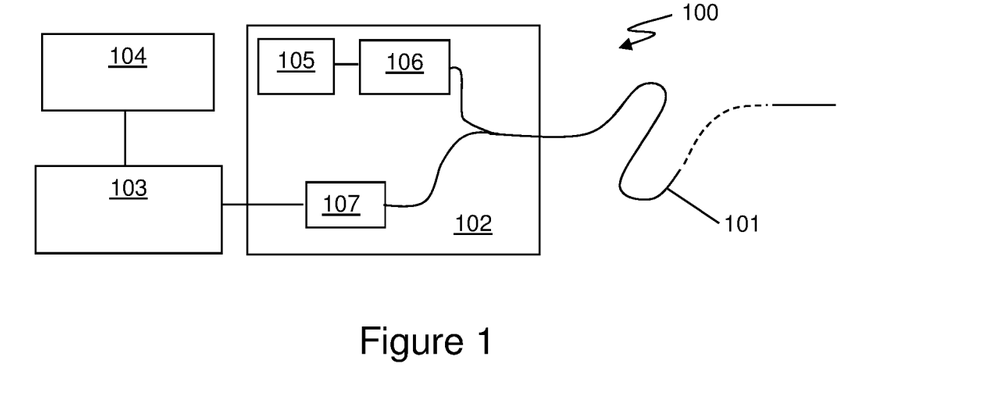
FIG. 1 illustrates a DAS sensor apparatus.

FIG. 1 shows a schematic of a distributed fibre optic sensing arrangement 100. A length of sensing fibre 101 is removably connected at one end to an interrogator unit 102. The output from interrogator unit 102 is passed to a signal processor 103, which may be co-located with the interrogator or may be remote therefrom, and optionally a user interface/graphical display 104, which in practice may be realised by an appropriately specified PC. The user interface may be co-located with the signal processor or may be remote therefrom.

The sensing fibre 101 can be many kilometres in length and can be, for instance 40 km or more in length. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide a sensing means where a low cost readily available fibre may be used. However in some embodiments the fibre may comprise a fibre which has been fabricated to be especially sensitive to incident vibrations. The fibre will be protected by containing it with a cable structure. In use the fibre 101 is deployed in an area of interest to be monitored which, in the present invention may be along the path of a railway as will be described.

In operation the interrogator unit 102 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 105 and at least one optical modulator 106 for producing a plurality of optical pulses separated by a known optical frequency difference. The interrogator also comprises at least one photodetector 107 arranged to detect radiation which is Rayleigh backscattered from the intrinsic scattering sites within the fibre 101. A Rayleigh backscatter DAS sensor is very useful in embodiments of the present invention but systems based on Brillouin or Raman scattering are also known and could be used in embodiments of the invention.

The signal from the photodetector is processed by signal processor 103. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions or channels. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre of the order of 40 km say provides 4000 independent acoustic channels or so deployed along the 40 km of railway. This can provide effectively simultaneous monitoring of the entire 40 km section of track. In an application to train monitoring the individual channels may each be of the order of 10 m in length or less.

As the sensing optical fibre is relatively inexpensive the sensing fibre may be deployed in a location in a permanent fashion as the costs of leaving the fibre in situ are not significant. The fibre may be deployed alongside the track and may for instance be buried alongside a section of track.

Figure 2:
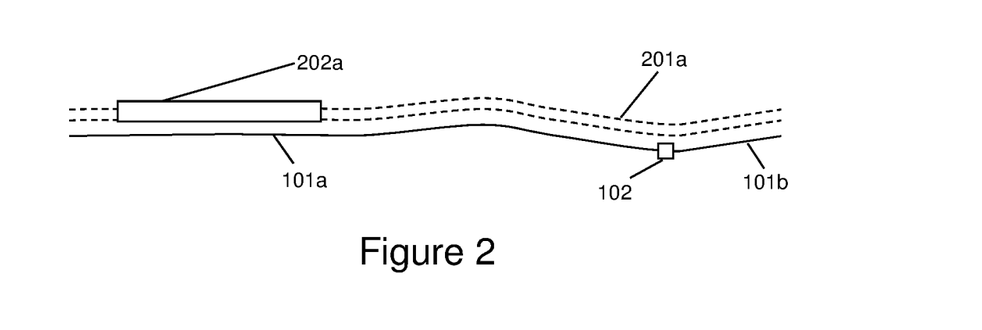
FIG. 2 illustrates how a DAS sensor may be deployed along a railway track.

As discussed, techniques incorporating the above described DAS sensors and processing apparatus have been proposed for a number of applications, including rail and track monitoring. For example, FIG. 2 illustrates a section of rail track 201a with an optical fibre deployed alongside at least part of the track 201a, for instance buried alongside the track. As mentioned above, fibre optic sensing can reliably be performed on fibre lengths of the order of 40-50 km. A length of 40-50 km may be sufficient to monitor a desired section of track, say between main stations, and other fibres could be deployed to monitor other sections of track. For very long tracks it may be necessary to chain several DAS sensors together. FIG. 2 illustrates one interrogator unit 102 arranged to monitor one optical fibre 101a deployed along one part of the track and another optical fibre 101b deployed along another length of track. The interrogator unit could have a dedicated interrogator for each sensing fibre, i.e. comprise two lasers and detectors etc., or at least some components such as the laser 105 and/or detector 107 could be multiplexed between the two fibres. After 40 km say of fibre 101b another fibre could be deployed which is monitored by another interrogator unit. Thus there could be 80 km or so between interrogator units.

In use the interrogator unit 102 operates as described above to provide a series of contiguous acoustic sensing channels along the path of the track. In use the acoustic signals generated by a train 202a in motion along the track 201a may be detected. The DAS sensor thus provides a monitoring system that can monitor long lengths of track with a high spatial resolution. As mentioned the sensing portions may be the order of metres in length. Deploying the sensor however simply involves laying a fibre optic cable along the path of the track—and in some instance suitable fibre optics may already be in place.

As a significant length of track can be monitored by contiguous sensing portions of fibre it can be relatively straightforward to detect train movement along the track. Clearly movement of the train will create a range of noises, from the engine noise of the locomotive, noises from the train cars and the couplings and noise from the wheels on the track. The acoustic signals will be greatest in the vicinity of the train and thus by looking at the intensity of the signals detected by the sensor, the returns from the sensing portions of fibre adjacent to the current position of the train can be detected as those exhibiting a relatively high acoustic intensity. In this way the movement of the train 202a on track 201a can be tracked.

Figure 3:
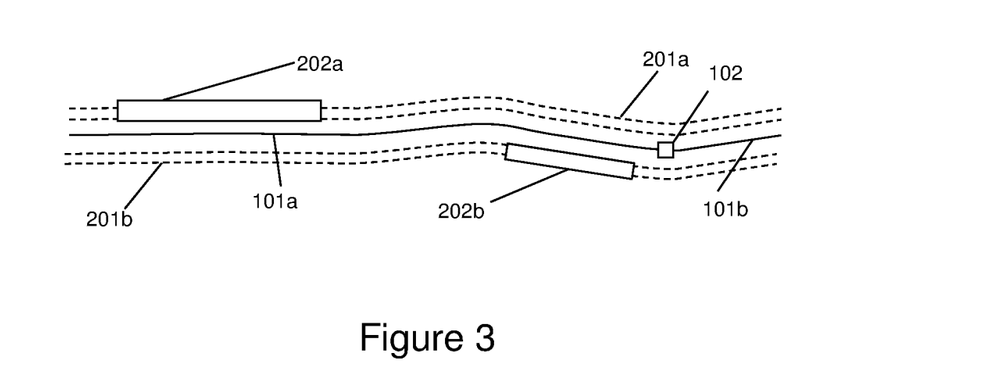
FIG. 3 illustrates how a DAS sensor may be deployed along a plurality of railway tracks.

An issue arises however in the vicinity of multiple tracks. For example, consider an example of a situation of rail monitoring such as illustrated in FIG. 3. In this example the optical fibres 101a and 101b are deployed in the vicinity of two rail tracks 201a and 201b, which, over at least the area illustrated, run generally alongside one another. It will be appreciated that train 202a travelling on track 201a may produce acoustic signals that, in general terms, appear be similar to acoustic signals that would be produced by train 202b travelling on track 201b. In such a situation it is potentially extremely difficult or in some cases impossible for the DAS sensor and processing apparatus to distinguish acoustic signals from a train on track 201a to a train travelling on track 201b without prior knowledge of which track a train is travelling on. This can represent a significant problem in some situations, for instance if the DAS system is part of a safety monitoring systems and needs to confirm that a train exiting a station is travelling on the correct track.

It may be possible, for at least one sensing portion, to analyse the acoustic signal current detected by that sensing portion to a reference for each of track 201a and 201b in order to try to determine which track the train is travelling on. However the problem is that the response of a given sensing portion to a train passing event may vary for different trains, i.e. the signal may vary for different types of train. For example a small passenger train may generate a different signal to a freight train and the freight train signal may depend on whether the train is fully loaded or empty. Even different trains of the same type may generate different signals. The acoustic signals detected may also vary with environmental conditions. It may therefore be very difficult to provide a suitable reference signal for a given sensing portion that can reliably allow different tracks to be distinguished from one another for train passes of different trains and/or in different environmental conditions.

Embodiments of the present disclosure thus relate to methods and apparatus for distributed fibre optic sensing, especially for distributed acoustic sensing (DAS). A method according to an embodiment involves performing distributed fibre optic sensing so as to generate at least one set of measurement signals from each of a plurality of sensing channels of an optical fibre in response to at least one event of interest. The event of interest may, for example, be a train passing event for a rail monitoring application. For the set of measurement signals, or each set if more than one, the measurement signals from different sensing channels are processed according to an association metric to determine whether any sensing channels are associated with one another. The association metric is some measure of an aspect of the measurement signals from the sensing channels, for instance the acoustic power or intensity of the sensing channel to the event of interest. A channel is deemed to be associated with another channel if the measurement signals, according to the association metric, indicate that the channels exhibited a similar response to the event of interest. For each set of measurement signals an association matrix is formed indicative of the sensing channels that are associated with one another.

A further set of measurement signals may then be acquired in response to a further event of interest and the further set of measurement signals processed based on said at least one association matrix to characterise said further event of interest.

Embodiments of the present invention make use of the realisation that, whilst each different event of interest, e.g. a train passing event, may represent a different stimulus and thus the acoustic response of a given channel will vary from event to event, in general the response of some different channels to the same type of event may be similar. Thus if it can be identified that in response to a first type of event a particular subset of channels are associated, in that they exhibit a similar response, then a new event can be characterised by looking at the response of those channels. If the relevant channels are also associated in their response to the new event, then the new event may be characterised as being of the first type.

This method thus avoids the problem that the response of an individual channel to the stimulus will vary with the stimulus and instead determines whether channels exhibit similar response to a stimulus of a certain type, even though the stimulus itself may vary. If so then such an association can be used, when considering the measurement signals from a new event.

As mentioned a given event of interest, for example a train travelling on a track, will produce a certain acoustic stimulus that can be detected as the measurement signals from the sensing channels of the sensing optical fibre. The measurement signals from a given event, i.e. one particular train pass, are processed to determine which channels are associated with one another. The measurement signal from one sensing channel can be compared to the measurement signal of another channel for the same event by comparing a suitable association metric or parameter. For example the association metric may comprise a measure of the acoustic intensity or power of the measurement signal from a sensing portion, during the event of interest. However other metrics may be used in other embodiments, and may comprise metrics based on the frequency of the measurement signals for instance. If the comparison meets a certain defined criteria then the channels are deemed to be associated, for example if the RMS power is within a certain threshold level.

An association metric for each channel may be determined and compared to an association metric for each other channel to determine which channels are associated with one another. An association matrix is formed indicating those channels which are associated with one another. If the association matrix is determined from a set of measurement signals obtained from just a single event of interest then the association matrix may simply comprise groupings of channels which are associated. In some instances however the association matrix may comprise an indication, for each possible pair of sensing channels, and an indication of whether that pair of sensing channels are associated with one another.

Whilst the association matrix may be based on the measurement signals from a single event of interest, it may be advantageous to form the association matrix based on the measurement signals from a plurality of events of interest that are identified as being of the same type, for example a train passing on a first track. In this case the method may comprise taking a plurality of subsets of the measurement signals, where each subset corresponds to the measurement signals from just one event of interest. The measurement signals from each subset may be processed according to the association metric, in the same way as discussed above, to determine which sensing channels are associated with one another for that subset. The association matrix is then formed by combining results for the plurality of subsets.

Thus for example the data from a plurality of train passes on a first track may be processed to determine an association matrix corresponding to the first track. The data from each individual train pass is processed to determine the channels that are associated and then the results are combined. There are various ways the association matrix could be formed from the results for subsets corresponding to the individual events of interest. In some embodiments a pair of channels may be deemed to be associated with one another only if they are deemed to be associated with one another in each, or a certain proportion, of the subsets. In some embodiments the difference in association metric for a given pair from the plurality of subsets may be summed or averaged and compared to a defined threshold.

In some embodiments a likelihood of association may be determined for each pair of channels for a given type of event. In some embodiments the likelihood of association may be determined by determining the proportion of subsets for which the pair of channels are deemed to be associated out of the total number of subsets.

As noted above there may be a plurality of types of events of interest. For instance a train passing on a first track may be identified as a first type of event of interest and a train passing on a second track may be identified as a second type of event of interest.

Given that the response of an individual sensing channel of the DAS sensor to a train passing event will depend on how much vibration the rail in the vicinity of the sensor experiences and the acoustic path between the rail and the sensing fibre, it is very unlikely that exactly the same channels will be associated with one another for trains passing on the first track as compared to trains passing on the second track.

The method may therefore take at least a first set of measurement signals acquired when trains pass on the first track and a second set of measurement signals acquired when trains pass on the second track and process each of the first and second sets to form respective association matrices.

Once one or more association matrices have been determined the method further comprises acquiring a further set of measurement signals each from a plurality of sensing channels in response to a further event of interest and processing said further set of measurement signals based on said association matrix to characterise said event of interest.

Once an association matrix has been determined, when a new event occurs the acoustic signature from this event can be processed. If this event returns a response with a sufficiently similar channel association response to the previously determined channel association matrix, then such an event may be characterised as being from the same type of event as the determined association matrix.

If there are a plurality of types of event then the method may determine whether the measurement signals from the further event of interest sufficient corresponds to an association matrix for an identified type of event. This may allow the characterisation of the new event as one of the identified types.

Even if there is only one type of event of interest, determining whether the measurement signal corresponds to the known association matrix may allow determination of any anomalous readings, which may indicate that something has significantly changed, for instance an indication of a possible defect in the rail.

As noted above embodiments may be applied to allow determination of which of a plurality of tracks that a rail vehicle is travelling on. As an example, data was acquired from a DAS system with a sensing fibre deployed along side a section of a rail network with two parallel tracks.

Figure 4:
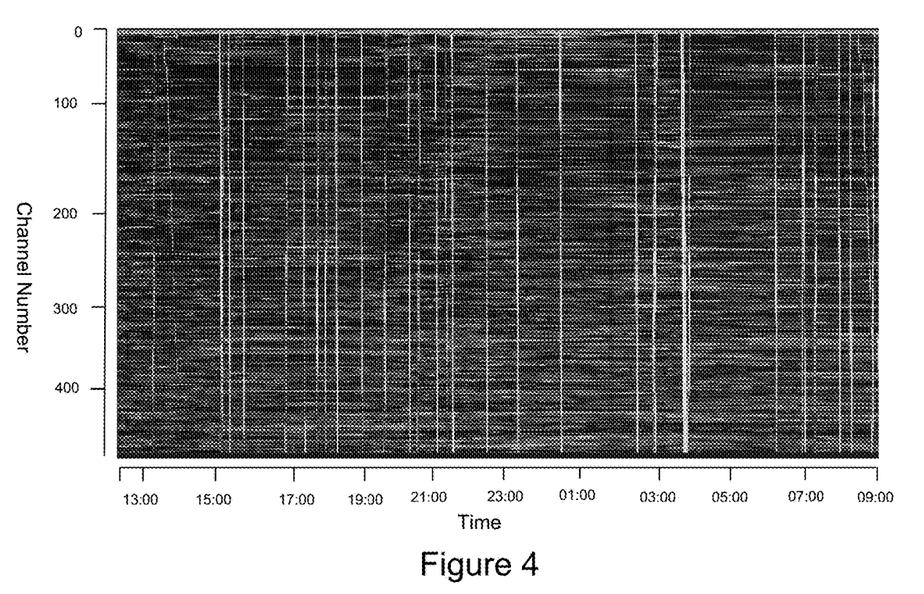
FIG. 4 illustrates a waterfall diagram of train passing events.

FIG. 4 illustrates a waterfall diagram showing data from the DAS sensor. This plots channel (vertical axis) against time (horizontal axis) and illustrates acoustic intensity (by colour in a non black and white version). FIG. 4 shows a series of train passing events detected by the DAS sensor, of which 25 events were extracted for further processing. The data was extracted over a 24 hour period from a frequency band of 200 to 300 Hz. Sixteen of the train passing events occurred on a first track (referred to as track A) and the other nine train passing events occurred on a second track (referred to as track B). Each train pass can be seen on this waterfall plot as a relatively vertical line of high intensity signals detected by the channels of the DAS sensor as the train passes the sensing portions.

It is difficult, from just the response of the individual channels to determine which train passing events are associated with track A or track B.

Figure 5:
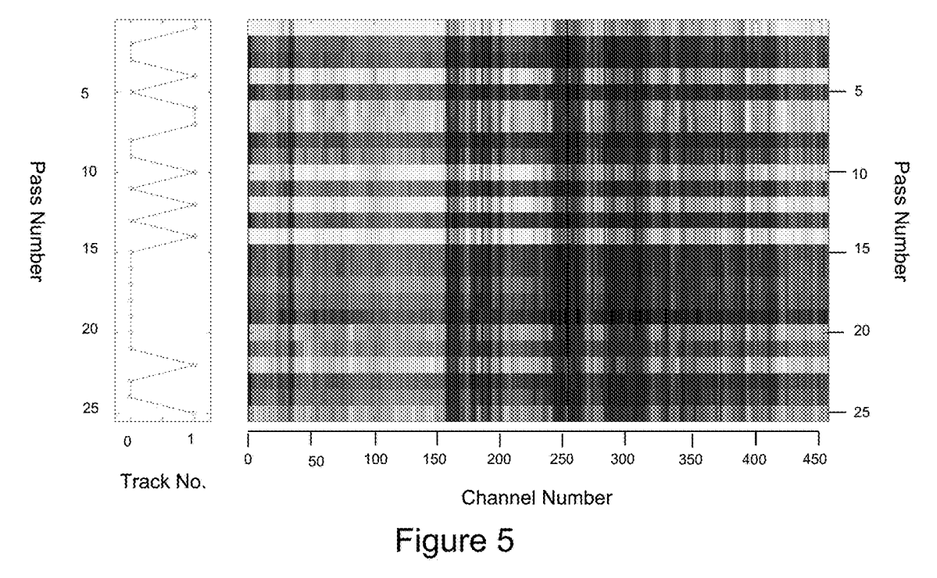
FIG. 5 illustrates dB RMS level of train passing events with corresponding track number.

In this example associations between channels were used to determine whether the train was on track A or track B. To determine the channel associations, a suitable association metric needs to be defined, i.e. metric that can be used to determine whether a pair of channels are associated with one another. In this example an average acoustic intensity metric was used and the mean RMS level of the measurement signal (in dB) was chosen as the association metric. Each of the twenty-five train passing events were extracted. In this example using a transient CFAR detector, and the RMS level of each channel was taken. FIG. 5 displays a plot of the mean RMS level over each channel for each of the 25 train passes and also indicates whether the train pass occurred on track A or track B (identified as track 0 and track 1 in the plot).

To determine which track a subsequent train passing event belongs to, an association matrix for each of track A and track B was determined. The calculated RMS values for track A and B were separated into separate data sets i.e. a data set of 16 train passing events for track A and a data set of 9 train passing events for track B. Within each set of data the subsets of measurement signals corresponding to a single event, i.e. train passes, were processed and the difference between the RMS level of one channel to every other channel was determined. If the difference was below a defined limit, in this example 1 dB, then the channels were deemed to be associated. The associations of one channel to every other channel was then stored in an association matrix by combining the results of each subset as discussed above.

It will, of course, be understood that the association metric being RMS measurement signal level and a defined threshold of 1 dB are mere examples of suitable metrics/limits and one skilled in the art will appreciate there are a number of parameters and limits that could be used to determine channel association.

A determined likelihood of association for a given pair of channels may additionally or alternatively be determined as part of the association matrix for each track. A likelihood of association may be determined by counting the number of times an association occurs between two given sensing channels for a given trains pass in the set, i.e. subset of measurement signals, and dividing by the total number of trains passes in the set, i.e. the number of subsets.

Figure 6:
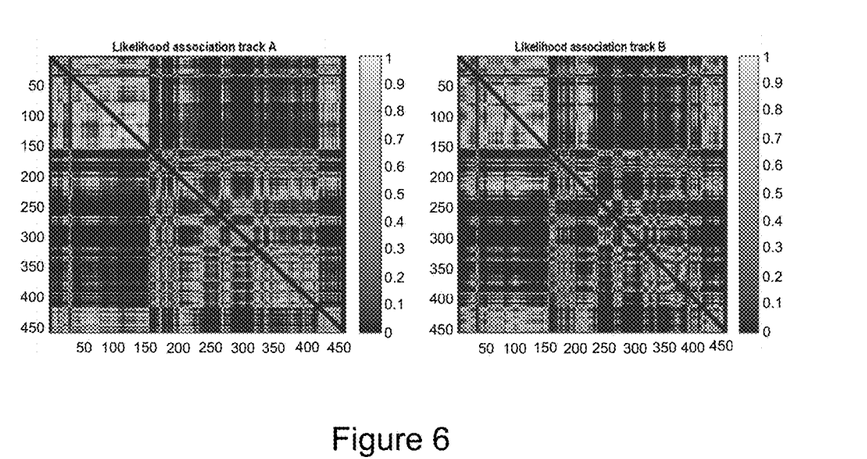
FIG. 6 illustrates association likelihood matrices for track A and B.

The association matrices comprising the relevant likelihoods of association for each of track A and track B are illustrated in FIG. 6.

Based on these association matrices, measurement signals from a further event of interest can be processed and characterised as an event of a train passing on track A or on track B.

In some embodiments Bayesian inference may be applied. From the association matrix data the probability of one channel being associated with another channel for a given train track can be determined.

The data from the new event of interest, i.e. the new train pass, may be processed to determine which channels are associated.

The method may comprise determining:

$$P(A \mid B) = \frac{P(B \mid A) P(A)}{P(B)}$$

where P(A|B) is the posterior belief of travelling on a given track A, given the determined association B for the new data, P(B|A) is the likelihood of association B, if the train were on track A (acquired from the association matrix), P(A) is the prior probability of travelling on track A (which may for example be initially set at some predefined value, say 0.5), and P(B) is the total probability of an association B e.g. a normalisation constant $\Sigma_A P(A) P(B|A) = \Sigma_A P(A \cap B')$ =P(B).

In this example the prior P(A) was initially set at 0.5 as there is, absence any information to the contrary an equal chance of the train being on track A or track B. As new channel associations are determined from a train passing event the posterior probability P(A|B) is updated and becomes the new prior.

Figure 7:
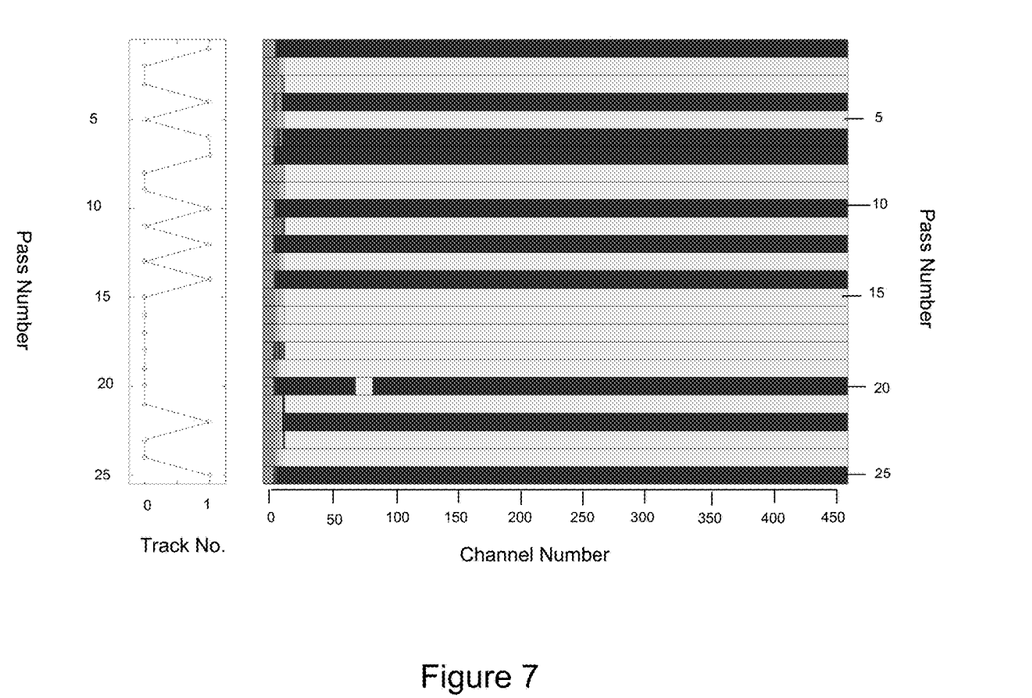
FIG. 7 illustrates posterior evolution for each train passing event.

The data from each of the individual train passes was processed according to this method as if it were newly acquired data. FIG. 7 illustrates how, for each pass, the posterior probability was updated as the processing proceeded. Initially of course there is no clear indication of what track the train was travelling on. However, for most of the passes once data from about channel 20 has been processed the method had indicated a strong probability that the train was on one particular track and the method had, in the vast majority of cases, correctly identified the relevant track. In this data set, there appears to be one error—in pass 20 the method indicates that the train was travelling on track B whereas it was identified as having travelled on track A. Further analysis indicated however that the relevant subset of data corresponded to a type of train that would have been travelling on track B. The method has thus correctly identified the relevant track.

Thus, using the above described method, once association matrices have been determined for each relevant train track, subsequent train passes can be assigned to a track using the association matrices, for instance using Bayesian inference. When a new train passing event is detected, the channel association procedure will be performed for the new passing event. By comparing these associations to the association matrix data, the new train passing event will be characterised to a particular track. The association data from the new passing event may then be incorporated into the association matrix of the assigned track, e.g. to update the likelihoods of association.

It will therefore be appreciated that this method can accurately determine which track a train is travelling on from acoustic signals from a number of channels, which previously has been difficult to achieve reliably. It will also be appreciated that the method discussed above is by way of example and there are a number of applications that the above discussion could be applied to.

For example the channel association techniques discussed above may be used to detect anomalies, for instance due to a fault developing in the track. One example is the detection a break in a rail track.

In this example the channel associations were applied to extracted DEMON (Detection of Envelope Modulation on Noise) features. Channel associations were performed on data from a number of train passing events for a particular section of track. An interpolated mean profile of the channel associates was determined as an association matrix.

Figure 8:
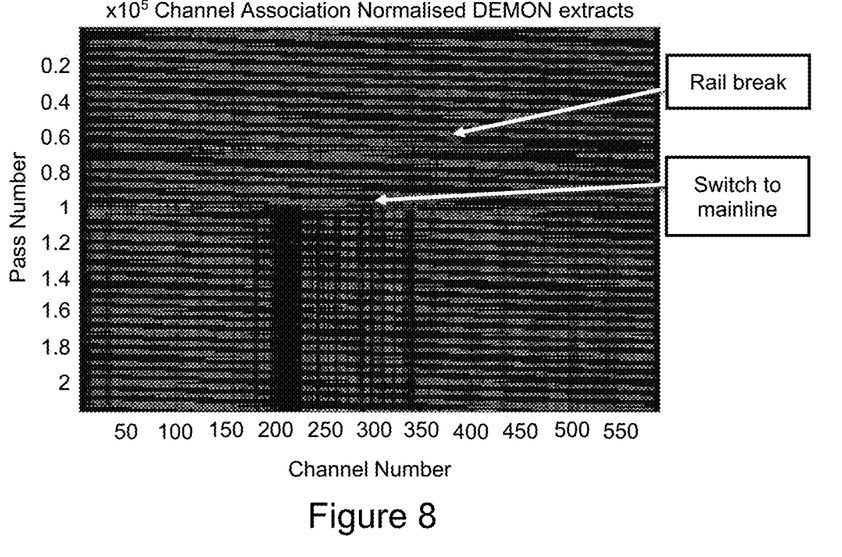
FIG. 8 illustrates a waterfall diagram of normalised channel association data.

As a new train passing event was detected, each channel of the new event was normalised by the determined interpolated mean profile. FIG. 8 displays the normalised DEMON extracts for each pass.

The normalised DEMON extracts determined from the channel association data provides an alternative method for detecting changes in a rail track. In this example the technique was used to detect a break in the rail track. A response in the normalised extracts data can be observed at around channel 360 of FIG. 8, indicative of a break in the rail track. It can then be observed between channels 175 and 340 that a train switches tracks. FIG. 8 shows that the switching of the track can be identified when normalisation is performed using the association matrix created from the opposite track. This thus provides an alternative track discrimination method to the Bayseian inference method discussed above.

An anomaly such as a break in a rail track will result in a significant change in the acoustic coupling between the rail and the sensing fibre in the vicinity of the break which may significantly change the response of certain channels. Other remote channels may not be affected however and thus such an anomaly may mean that channels that previously were associated with one another start to exhibit a significantly different response. This results in a set of measurement signals with channel associations that are very different to those previously established. Whilst detecting the change in an individual sensing portion may be difficult as each train pass provides a different stimulus, using the channel associations to normalise the data from a given train pass allows such anomalies to be readily detectable.

This example displays a technique to monitoring changes in a rail track that is robust to different trains and environmental conditions.

It will be appreciated that the techniques discussed could be utilized in a number of applications in infrastructure monitoring. Within rail monitoring any change to a rail track or the surrounding environment could be detected from sources such as flooding, loose ties or loss of ballast. A track discrimination type technique could easily be applied to applications such as road lane discrimination and characterisation of conveyor belts carrying items. The techniques could also be used to monitor changes in pipelines and the surrounding environment, particularly during pigging run operations.

The above identified examples and many other applications benefit from the many advantages displayed by this technique over other infrastructure monitoring tools. It has clearly been identified that the technique can discriminate fixed input signals travelling through different transfer paths, which has previously been shown to be problematic. Once the channel association data has been determined it can be used to determine many fixed input signal discriminations over a long period of time. The channel association approach provides a relationship between channels that is statistically independent of inputs such as train mass and speed. This enables the technique to filter out irrelevant signals from such sources forming background noise. As with other DAS related applications, the techniques discussed here can provide monitoring over large distances of up to 40 km using conventional optical fibres. These techniques can easily be incorporated into the processor of a conventional DAS setup as displayed in FIG. 1. Therefore deployment and maintenance of the apparatus involved with these techniques is well-established and one skilled in the art would be familiar with such techniques.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of distributed fibre optic sensing, comprising;
performing distributed fibre optic sensing so as to generate at least one set of measurement signals over a period of time from each of a plurality of sensing channels of an optical fibre in response to at least one event of interest of a known type, wherein the optical fibre is deployed to run along a path of at least part of at least one rail track;
for the or each set of measurement signals, determining a first parameter of each of the measurement signals, comparing the determined first parameters for different sensing channels with one another, identifying sensing channels where the determined first parameters differ by less than a defined amount as being associated with one another and forming at least one association matrix indicative of the sensing channels that are determined to be associated with one another;
performing distributed fibre optic sensing to acquire a further set of measurement signals over a period of time from said sensing channels in response to a further unknown event of interest; and
processing said further set of measurement signals based on said at least one association matrix to determine whether the same sensing channels are associated with one another to determine whether said further event of interest is of the known type, wherein the at least one association matrix comprises a set of measurement signals indicative of known events of interest, wherein the known events of interest comprise at least one of: a train on a first track, a train on a second track, a train passing event, a fault in a track, a break in the track, or a flooded track.

2. The method according to claim 1 further comprising determining a likelihood of association for at least one pair of sensing channels.

3. The method according to claim 2 wherein the association matrix stores, for each pair of sensing channels, the determined likelihood of association.

4. The method according to claim 1 wherein at least a first set of measurement signals comprises measurement signals from the sensing channels in response to each of a plurality of events of interest of a first type.

5. The method according to claim 4 wherein processing said measurement signals of the first set comprises taking a plurality of subsets of the measurement signals, where each subset corresponds to the measurement signals from one event of interest, processing the measurement signals of each subset to determine which sensing channels are associated with one another for that subset; and forming the association matrix by combining results for the plurality of subsets.

6. The method according to claim 5, wherein processing said measurement signals to determine which sensing channels are associated with one another comprises determining a likelihood of association for at least one pair of sensing channels and wherein the likelihood of association for a pair of sensing channels is determined by determining the proportion of subsets in which that pair of channels are determined to be associated with one another.

7. The method according to claim 1 wherein the method comprises generating a plurality of sets of measurement signals and a corresponding association matrix for each set of measurement signals, wherein each set of measurement signals corresponds to measurement signals acquired in response to respective events of interest identified as being of a different type to one another.

8. The method according to claim 7 wherein characterising said further event of interest comprises determining whether the further event of interest matches one of the types of event of interest.

9. The method according to claim 7 wherein characterising said further event of interest comprises determining whether the further set of measurement signals exhibits channel associations that corresponds to one of the determined association matrices.

10. The method according to claim 1 wherein determining whether the further event of interest matches one of the identified types of event of interest comprises, as the further set of measurement signals are acquired:
determining a channel association for the further event of interest; and
determining the probability that the further event of interest is of a first type based on a probability, determined from the association matrix for events of the first type, that the channel association would be experienced if the event were of the first type.

11. The method according to claim 1 wherein the first metric is a measure of acoustic intensity of the measurement signal of a sensing channel.

12. The method according to claim 11 wherein a pair of sensing channels are identified as being associated with one another if the measure of acoustic intensity for each sensing channel is within 1 dB.

13. The method according to claim 1 wherein characterising the further event of interest comprises identifying any significant change in channel association for the further event of interest compared to a previously determined association matrix.

14. The method according to claim 1, wherein the method comprises generating a plurality of sets of measurement signals and a corresponding association matrix for each set of measurement signals, wherein each set of measurement signals correspond to measurement signals acquired in response to respective events of interest identified as being of a different type to one another and wherein at least part of the optical fibre is deployed to run alongside a plurality of rail tracks and a train travelling on one rail track is identified as an event of interest of one type and a train travelling on another rail track is identified as an event of interest of a different type.

15. The method according to claim 14, wherein the method determines which rail track the train is travelling on.

16. A method of distributed fibre optic sensing, comprising;
performing distributed fibre optic sensing on an optical fibre deployed at least partly along the path of a rail track so as to generate a set of measurement signals over a period of time from each of a plurality of sensing channels of said optical fibre for each of one or more train passing events of a known type;
determining a first parameter of each of the measurement signals, comparing the determined first parameters for different sensing channels with one another, identifying sensing channels where the determined first parameters differ by less than a defined amount as being associated with one another and forming an association matrix indicative of the sensing channels that are determined to be associated with one another;
acquiring a further set of measurement signals from each of a plurality of sensing channels over a period of time in response to a further train passing event of an unknown type; and
determining whether the further set of measurement signals exhibits a difference in channel association from the association matrix.

17. The method as claimed in claim 16 comprising forming a normalised set of measurement signals which is normalised based on the association matrix.

18. The method according to claim 16 comprising identifying a possible fault with the track based on an identified difference in channel association from the association matrix.

19. An apparatus, comprising;
a distributed fibre optic sensor configured to interrogate an optical fibre deployed in an area of interest to detect measurement signals at each of a plurality of sensing channels of said optical fibre, wherein the optical fibre is deployed to run along a path of at least part of at least one rail track; and
a processor, configured to:
take at least one set of measurement signals acquired over a period of time in response to at least one event of interest of a known type;
for the or each set of measurement signals, determine a first parameter of each of the measurement signals, compare the determined first parameters for different sensing channels with one another, identify measurement signals wherein the determined first parameters differ by less than a defined amount as being associated with one another and form at least one association matrix indicative of the sensing channels that are determined to be associated with one another;
acquire a further set of measurement signals over a period of time corresponding to data acquired from the optical fibre distributed acoustic sensor in response to a further unknown event of interest; and
process said further set of measurement signals based on said at least one association matrix to determine whether the same sensing channels are associated with one another to determine whether said further event of interest is of the known type, wherein the at least one association matrix comprises a set of measurement signals indicative of known events of interest, wherein the known events of interest comprise at least one of: a train on a first track, a train on a second track, a train passing event, a fault in a track, a break in the track, or a flooded track.

\* \* \* \* \*